Oct. 8, 1957  L. E. SODERQUIST  2,808,618
PRESS FOR SHAPING AND VULCANIZING PNEUMATIC TIRES
Filed March 16, 1954  6 Sheets-Sheet 1

INVENTOR.
LESLIE E.
SODERQUIST
BY
Ely, Frye & Hamilton
ATTORNEYS

INVENTOR.
LESLIE E. SODERQUIST
BY Ely, Frye & Hamilton
ATTORNEYS

INVENTOR.
LESLIE E. SODERQUIST
BY
ATTORNEYS

Oct. 8, 1957 L. E. SODERQUIST 2,808,618
PRESS FOR SHAPING AND VULCANIZING PNEUMATIC TIRES
Filed March 16, 1954 6 Sheets-Sheet 5

INVENTOR.
LESLIE E. SODERQUIST
BY Ely, Frye & Hamilton
ATTORNEYS

Oct. 8, 1957 L. E. SODERQUIST 2,808,618
PRESS FOR SHAPING AND VULCANIZING PNEUMATIC TIRES
Filed March 16, 1954 6 Sheets-Sheet 6
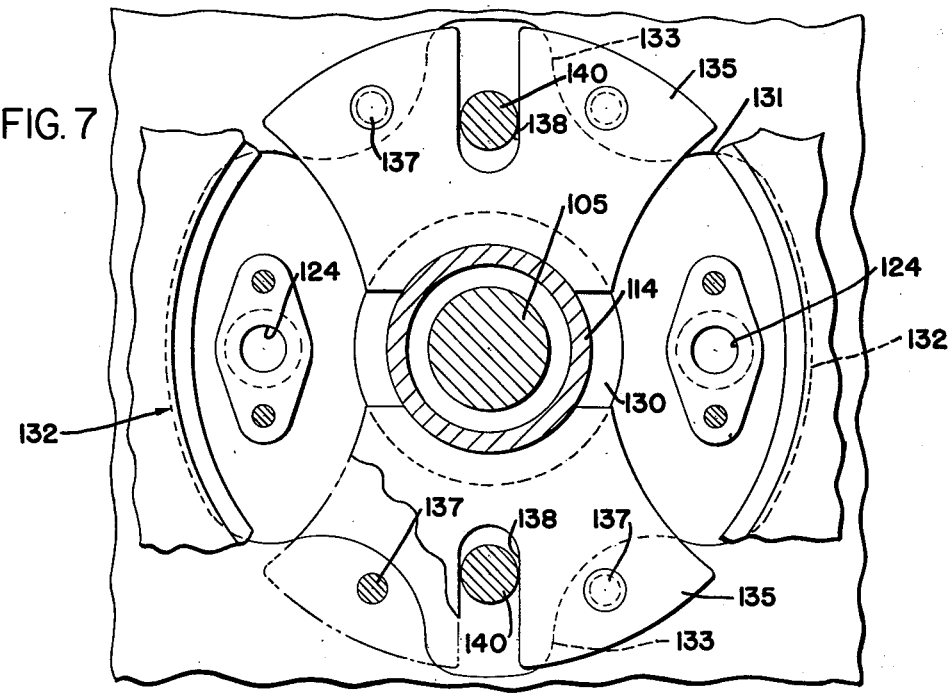
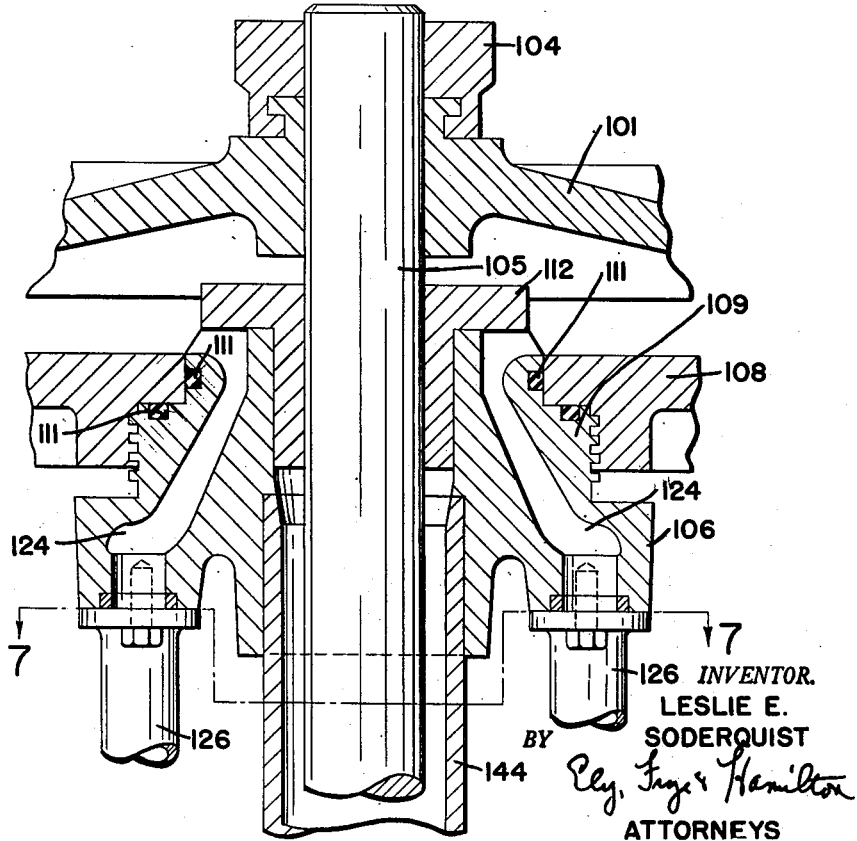
INVENTOR.
LESLIE E.
SODERQUIST
BY
ATTORNEYS

United States Patent Office 2,808,618
Patented Oct. 8, 1957

2,808,618

PRESS FOR SHAPING AND VULCANIZING PNEUMATIC TIRES

Leslie E. Soderquist, Akron, Ohio, assignor to The McNeil Machine & Engineering Company, Akron, Ohio, a corporation of Ohio Application March 16, 1954, Serial No. 416,598

2 Claims. (Cl. 18—17)

The present invention is directed to improvements in the construction of presses for the shaping and vulcanizing of pneumatic tires. Presses of this type are characterized by the presence of an inflatable diaphragm located between the two sections of a tire mold mounted in the press. The closure of the press and the inflation of the diaphragm shape the tire. After the requisite period for the vulcanization of the tire, the press is opened, the tire stripped from the mold sections and the diaphragm stripped from the tire.

Presses of this type are now well known in the art, having been put into commercial use by the developments of the present inventor. Prior United States Patents Nos. 2,495,663 and 2,495,664 are typical examples of presses which employ the general principles set forth above.

The object of the present invention is to improve and simplify the construction and operation of tire shaping and vulcanizing presses which employ a diaphragm for shaping and vulcanizing tires which are made in the unvulcanized flat or pulley band form.

The press which is shown and described herein is designed to embody the basic principles of applicant's prior patents, but is simplified without sacrificing any of the essentials for economical and practical shaping and vulcanization of pneumatic tires. The press is intended to be substantially automatic, the work of the operator being merely to place the uncured band in the press, and with the pressure of a starting button the press will close, shaping the band during the closing. After the requisite interval, which should be controlled by an automatic timer, the details of which are well known in the art, the press opens, the tire is stripped from the mold and the diaphragm stripped from the tire, which is now in a position to be lifted out of the press by the operator.

The press of the present invention provides a new and improved mechanism for raising and lowering the movable mold section, which is preferably the upper mold section, although the principles of the invention may be employed with either or both mold sections movably mounted. The mechanism for raising and lowering the movable mold section may be used independently of the diaphragm.

It will be appreciated that while the description of the mechanism and its mode of operation is shown and described in great detail, many of the details may be altered or modified and improved without departing from the essential features of the invention as set forth in the appended claims.

In the drawings, in which the preferred form of the invention is shown in such detail as to enable those skilled in the art to understand the invention:

Fig. 7 is a horizontal section through the diaphragm operating mechanism on the lines 7—7 of Figs. 5 and 8.

Fig. 8 is a vertical section on the line 8—8 of Fig. 3.

Figure 1:
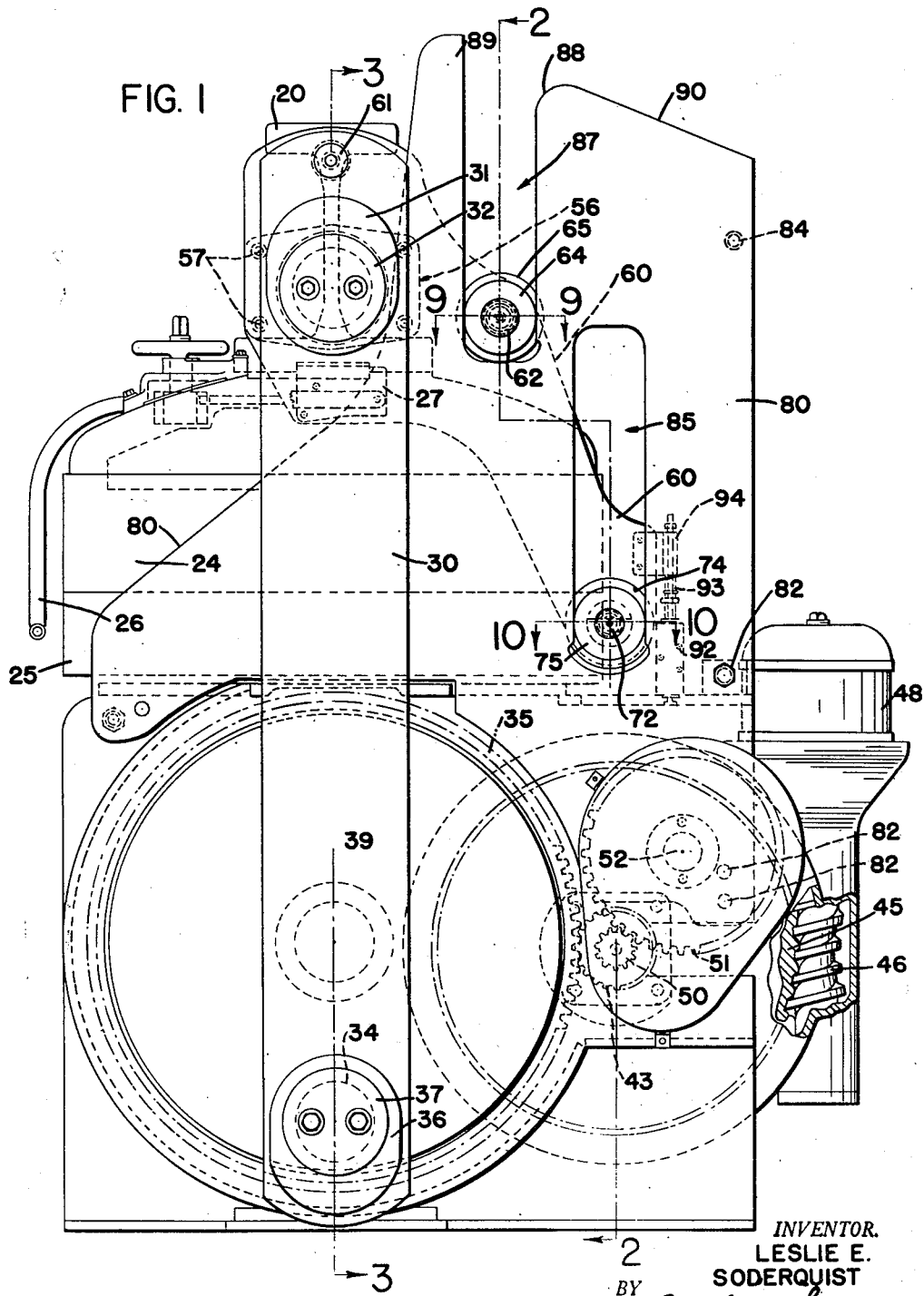
Fig. 1 is a side elevation of the improved tire shaping and vulcanizing press with the press closed.
Figure 2:
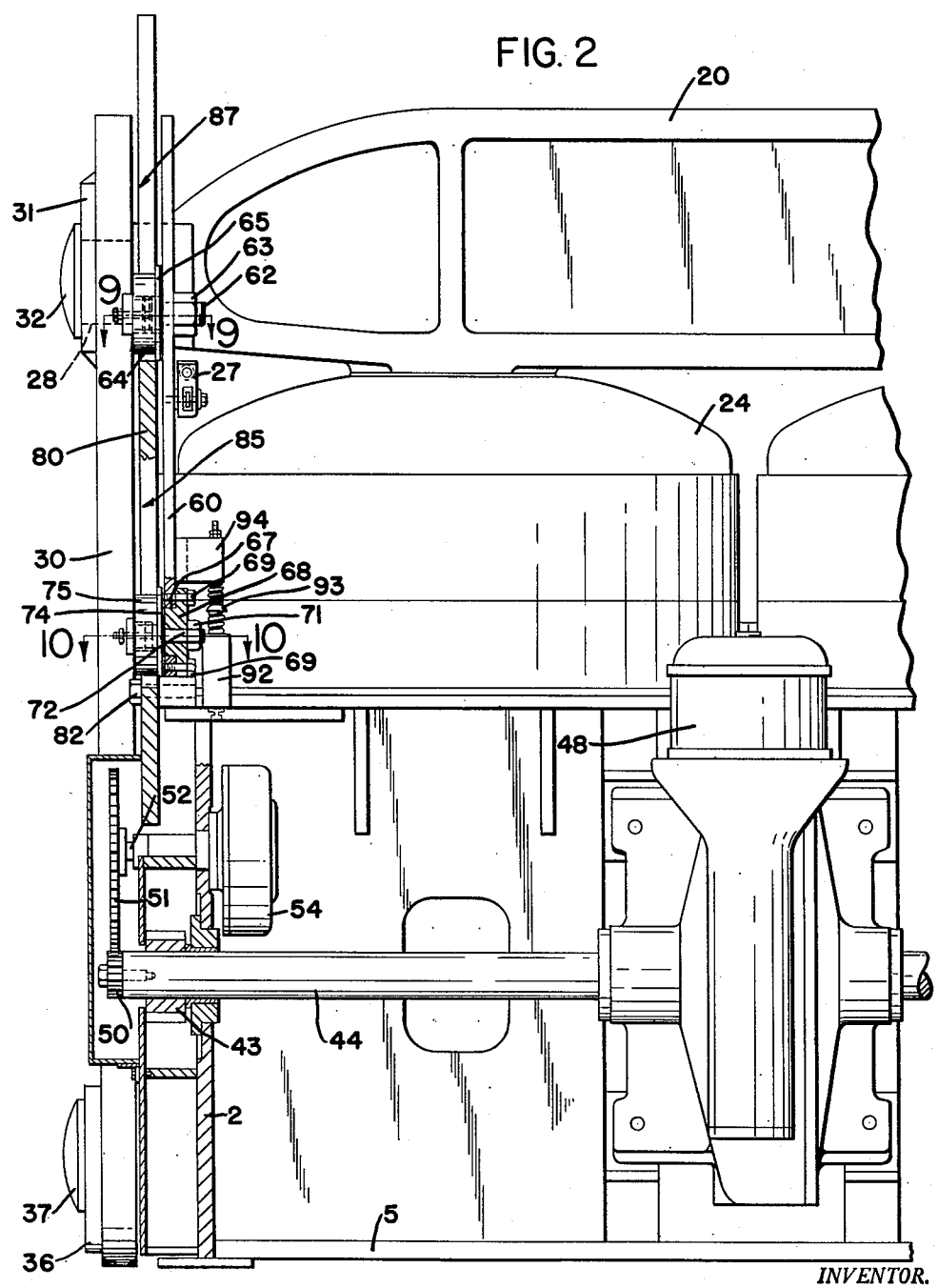
Fig. 2 is a rear elevation and partial section on the broken line 2—2 of Fig. 1.
Figure 3:
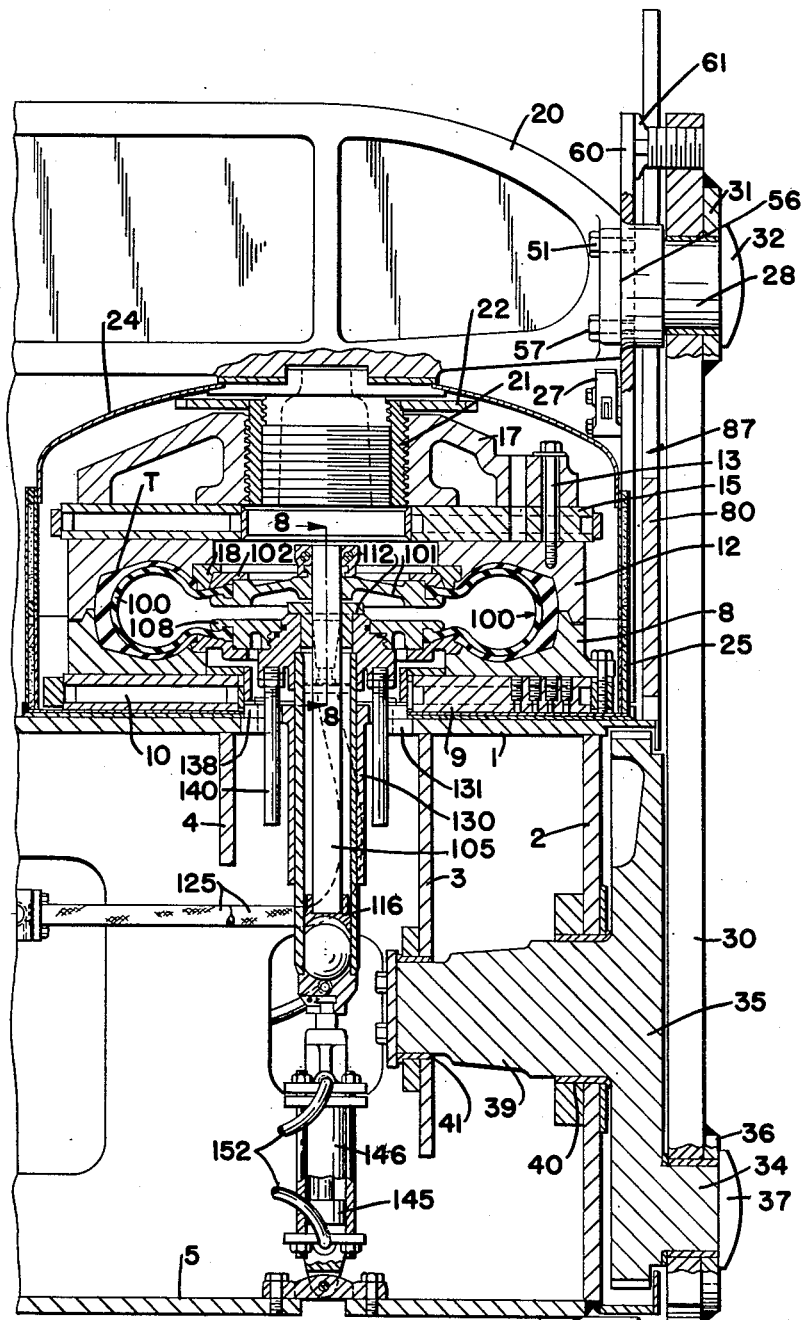
Fig. 3 is a vertical section on the line 3—3 of Fig. 1.
Figures 9, 10:
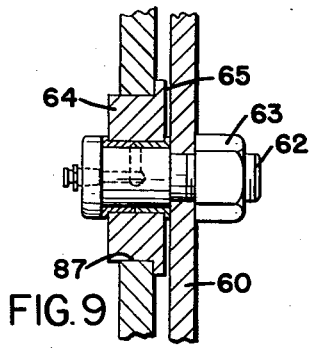

Figs. 9 and 10 are enlarged detail views on the lines 9—9 and 10—10, respectively, of Figs. 1 and 2.

*Press operating mechanism*

In the form of the invention illustrated herein, the bed plate of the press 1 is secured to the upper edge of the several vertical webs 2, 3 and 4 which constitute the lower frame of the press supported upon the base plate 5. The press shown herein is a dual press having a pair of molds mounted therein, but as the invention may be embodied with a single mold structure, the description will be primarily directed to one curing unit.

The press shown herein is of the platen type, but this is not essential as jacketed molds or a steam dome may be used. The lower or stationary mold section is indicated at 8 and is mounted on a platen 9 secured to the bed plate and provided with passages 10 through which steam will circulate to heat the lower mold section. The upper, or movable, mold section 12 is fastened by bolts 13 to the underside of a cored-out platen 15 secured to the underside of the movable mold support 17. The upper mold section has an upper bead ring 18 fixed thereon, the inside of which is beveled to fit the upper diaphragm ring to be described. The support 17 is carried on the underside of the heavy cross beam 20 which extends across the press and constitutes one of the links of the toggle mechanism by which the press is opened or closed, the closing operation exerting a very powerful squeeze on the two mold sections. The connection between the cross beam 20 and the two upper platens is such as to permit adjustment for different sizes of molds and is constituted by the double screw-threaded connection indicated at 21 which is adjustable by the gear wheel 22 attached to the central member of the connection and is operated as described in applicant's prior Patent No. 2,358,763 of September 19, 1944.

There is supported on the cross beam 20 an inverted cover 24, the lower edge of which, when the press is closed, has a tight edge-to-edge contact with the upper edge of the mating wall 25 which together constitute an insulated housing for the mold. A safety bar 26 extends across the press to throw a switch, stopping the closing of the press should the workman be in the path of the upper mold. The ends of the bar are held in plates 27 secured to a guide arm to be described.

The beam 20 extends across the press and at each end is provided with a heavy trunnion 28 which is rotatably mounted in a bearing in the upper end of the long vertical link 30 which constitutes the other element of the press operating toggle. A reinforcing plate 31 is welded to the link at the trunnion and a cap plate 32 holds the link in place.

The links 30 are pivotally mounted at their lower ends on trunnions 34 formed on large bull-gears 35 in the base of the press, a reinforcing plate 36 and a cap plate 37 holding each link on the bull-gear. The shaft 39 of each bull-gear is mounted in reinforced bearings 40 and 41 in the vertical webs 2 and 3 respectively. The bull-gears 35 are driven through the pinions 43 which are secured to the ends of the main drive shaft 44 which extends across the base at the rear of the press. At the center of the press the shaft 44 is fixed to a drive gear 45 which is driven through a worm 46 from the reversible motor 48 at the rear of the press.

To one end of the shaft 44 is attached a small pinion 50 which meshes with and drives a large gear 51 attached to a shaft 52 which operates limit switches housed in a box 54 mounted in the base. As is customary with this type of press, the operations of the press are controlled, after the press is started, by limit switches, which also control the admission of shaping pressure into the diaphragm. After the press is closed, the internal pressure within the diaphragm is controlled by a separate timer (not shown).

When the bull gear 35 is in the position shown in Fig. 1, with the bearing 34 at its lowermost point, the molds are closed about the tire, and when the bearing is moved to the top the press is fully opened. In the operation of the press, the upper mold section, at the top of its movement, is tilted and swung out of the way at the rear of the press so as to permit full access to the space where the band is placed in position over the extended diaphragm and where the finished tire is removed. In the closing operation the upper mold is first rocked into parallelism with the lower mold, as shown in dotted lines in Fig. 4, and is then moved downwardly in a straight line, the upper mold contacting the upper edge of the extended diaphragm and the upper edge of the tire band B, and serving to compress both the band and the diaphragm while the press is closing. On opening, the movement of the upper mold is in reverse.

The path of movement of the upper mold is controlled by mechanism which will now be described. At each end of the cross beam 20, immediately behind the trunnion 28, is machined a flat land, the outline of which is indicated by the dotted line 56 in Fig. 1, and fitting over the end of the cross beam and attached thereto by bolts 57 is a guide arm 60, the outline of which is shown in Fig. 1. The enlarged upper end of each guide arm lies directly behind and is parallel to the adjacent link 30, while the lower end of the arm extends downwardly and backwardly from the trunnion 28. At the upper end of each link 30 is an adjustable pad 61 which rides upon the upper edge of the guide arm to insure alignment of the upper and lower mold sections.

Part way down each arm, opposite the trunnion 28, is mounted a bearing pin 62 held in position by a nut 63. On the end of this pin, which projects toward the link 30 is a guide roller 64 which is confined between the head of the pin and a washer 65. At the lower end of the arm 60 and offset from the guide roller 64 is a relatively large aperture 67 in which is located a plate 68 which overlaps the inside of the guide arm and is held in position by bolts 69. In the plate 68 and held by nut 71 is a second bearing pin 72 which projects toward the link 30. On the end of this pin and confined between the head of the pin and a washer 74 is a second guide roller 75. The aperture for the bearing pin 72 is located off-center with respect to the plate 68 (see Fig. 10) so that by rotating the plate 68 in its seat, the upper mold section may be brought into parallelism with the lower mold section when the press is closed. By this provision any irregularities in machining the parts may be compensated. For holding the plate in its adjusted position, it is provided with a plurality of holes 70 through which the bolts 69 may be inserted to fix the plate in its adjusted positions.

The two pairs of guide rollers 64 and 75 maintain the upper mold section in parallelism to the lower mold section during the first part of the opening movement of the press and the latter part of the closing movement while the tire band and diaphragm are being shaped.

Figure 4:
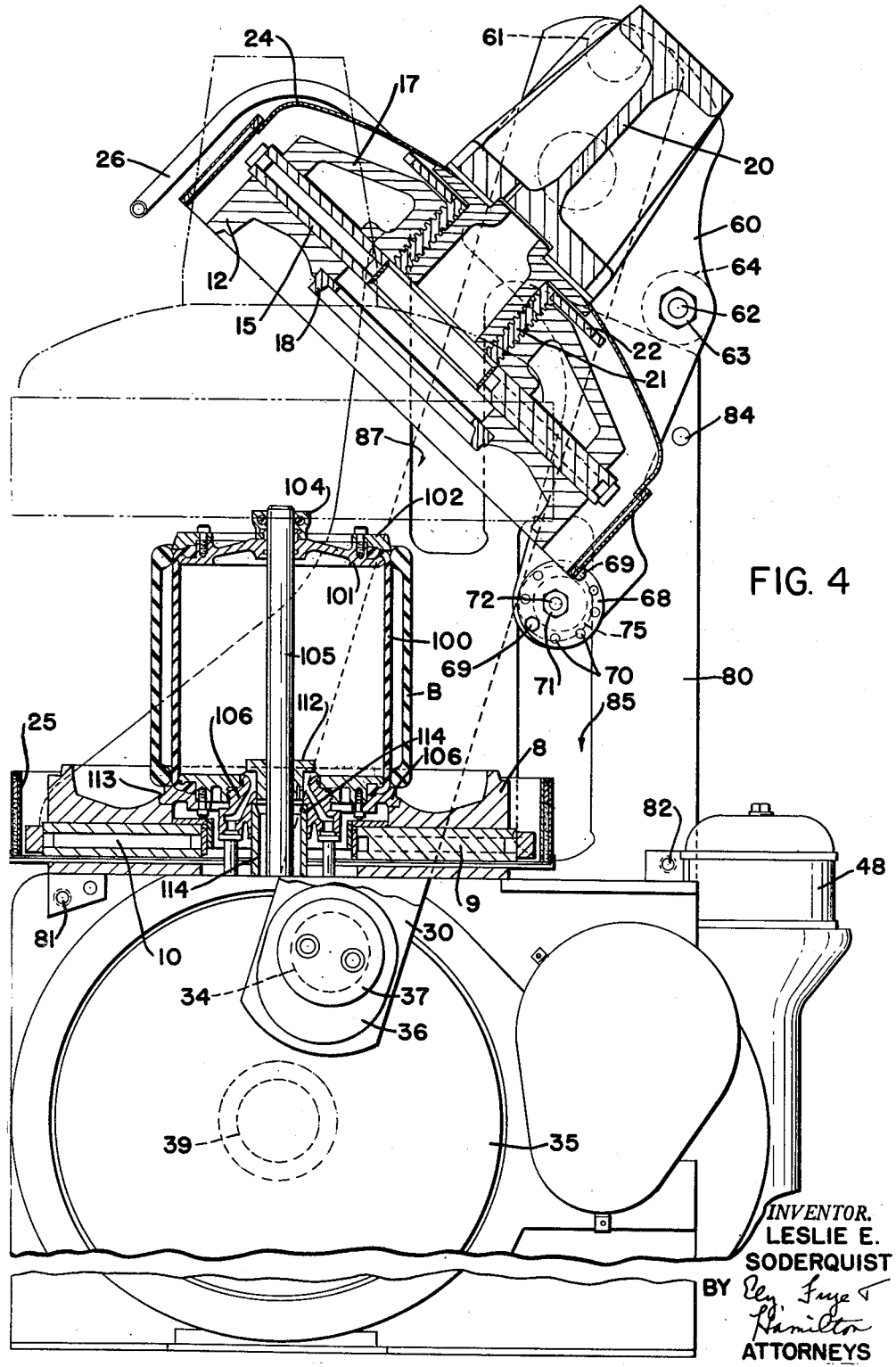
Fig. 4 is a vertical section through the press from front to back showing the press fully opened and an uncured tire band in position.

For this purpose, there is located on each side of the press, between the link 30 and the adjacent guide arm 60, a heavy vertical guiding plate 80. The contour of this plate is shown in Figs. 1 and 4. It extends from the base of the press to which it is secured by the bolts 81 and 82 at the front and back of the press to a point well above the location of the beam 20 when the press is closed. It is cut back along the forward edge at the top of the plate so as not to interfere with the movement of the cross head. On each plate 80 is a safety stop pin 84 which will serve to arrest backward movement of the guide arm 60.

In each guiding plate 80 is a lower vertical guideway or track 85 in which the roller 75 moves from a position at the lower end of the guideway, when the press is closed, to a position at the top of the guideway when the upper mold is at the upper limit of its straight line movement, and then lowers as the upper mold tilts backwardly until the roller 75 assumes the position shown in Fig. 4.

Forwardly of and above the guideway 85 is the parallel guideway 87 in which the roller 64 is guided during the vertical straight line movement of the upper mold section. As shown in Fig. 1, the upper end of the guideway 87 is open and the rear wall thereof is rounded as at 88. The front wall of the guideway extends above the rear wall as at 89. From the point 88 the upper edge of the plate 80 is cut on a diagonally rearwardly descending path to form a track 90.

The operation will be understood from a comparison of Figs. 1 and 4. Starting at Fig. 1 with the mold closed, as the pivots for the lower ends of the links 30 are raised through the rotation of the bull gears, the rollers 64 and 75, riding on the guideways, will keep the mold sections in parallelism until the roller 64 reaches the upper end of the guideway 87, by which it is arrested. Continued upward movement of the links 30 causes the rollers 64 to ride over the curved surfaces 88 and onto the tracks 90 down which they will move as the links continue to rise. The backward and downward movement of the rollers 64 over the tracks 90 causes the upper mold section to tilt backwardly, rotating about the roller 75 until rotation of the bull gear 35 and the upward movement of the links 30 is arrested by a limit switch. During the backwardly tilting movement of the upper mold section, the cross head 20 will move over the upper edges of the guide plates 80 as shown in Fig. 4, saving much head room and making a very compact arrangement for handling tires of relatively large cross-section. On closing movement the downward movement of the links 30 will cause the rollers 64 to return over the tracks 90 until they enter the vertical portions of the guideways 87, whereupon the upper mold section will be parallel with the lower mold section and the further downward movement of the links 30 will cause the upper mold to return to its closed position.

In order to prevent accident due to the opening of a mold while steam pressure is still on in the diaphragm, a spring-loaded switch is located on the bed plate and bears the numeral 92. This switch controls the supply of operating pressure to the several control instrumentalities of the press. At the rear of the guide arm is located a spring-pressed plunger 93 mounted in a bracket 94 on the arm 60. When the press is closed this plunger 93 will contact the switch 92 and open the supply of fluid pressure, but as soon as the mold starts its upward movement the switch will be released and the valve will be closed. It will be understood that the safety control just described does not affect the admission to the diaphragm of low pressure steam to preliminarily shape the diaphragm during the closing of the press. This latter operation is controlled by the limit switch 54.

*The diaphragm and diaphragm operating mechanism*

The diaphragm 100 is a relatively heavy rubber or rubber-like cylinder, having beaded upper and lower edges. The upper edge of the diaphragm is clamped between an upper diaphragm ring or plate 101 and a clamping ring 102 having a beveled outer surface 103 to fit into the upper bead ring 18. The upper ring assembly is fixed by a split clamping collar 104 to a long vertical operating shaft 105.

The lower edge of the diaphragm is clamped between a lower diaphragm ring or plate 106 and a clamp ring 108 which is threaded onto a central boss 109 of the lower plate. The inner edge of the ring 108 overlies the central boss as shown in Fig. 8 where gaskets 111 seal the juncture of the two elements. The outer rim of the plate 106 is formed with a ledge 110 which underlies the lower bead of the tire and serves as a means for lifting the tire out of the lower mold section 8 which is provided with a recess 113 to receive the ledge. In the center of the plate 106 is fitted a sleeve 112 which has a sliding fit over the shaft 105. Fitting in and depending from the under side of the lower diaphragm ring is a cylinder 114 which surrounds but is spaced from the shaft 105, and secured on the lower end of the shaft is a collar 116 which has a sliding fit with the interior of the cylinder 114. The lower end of the cylinder is closed by a plug 118.

The under side of the collar 116 and the upper side of the plug 118 are provided with oppositely faced hemispherical seats or recesses, and located between these two elements is the ball piston 120. This piston is preferably composed of butyl rubber or some similar rubbery material which resists the action of any water or oil which may collect in the cylinder 114. The ball piston is preferably somewhat larger in diameter than the internal diameter of the cylinder so that the ball will be somewhat flattened and compressed in its central zone, making a tight sliding fit with the cylinder. Any water of condensation collecting on the top of the ball piston will lubricate the piston.

Fluid under pressure to raise the piston 120, and with it the shaft 105 and the upper diaphragm ring relative to the lower diaphragm ring, is admitted through a line 122 entering through the plug 118, the admission of pressure and the release thereof being controlled by the limit switch.

To circulate the steam through the diaphragm to shape and cure the tire, the lower diaphragm plate is provided with passages 124 to the lower ends of which are attached by pipes 126 the flexible hose lines 125 leading from the source of steam pressure.

Figure 5:
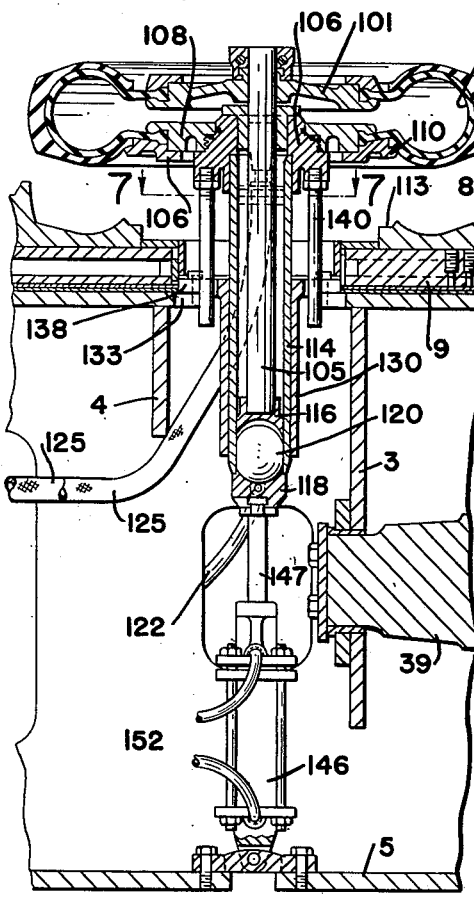
Fig. 5 is a vertical section through the diaphragm operating mechanism showing the cured tire lifted from the lower mold section, but with the diaphragm still within the tire.
Figure 6:
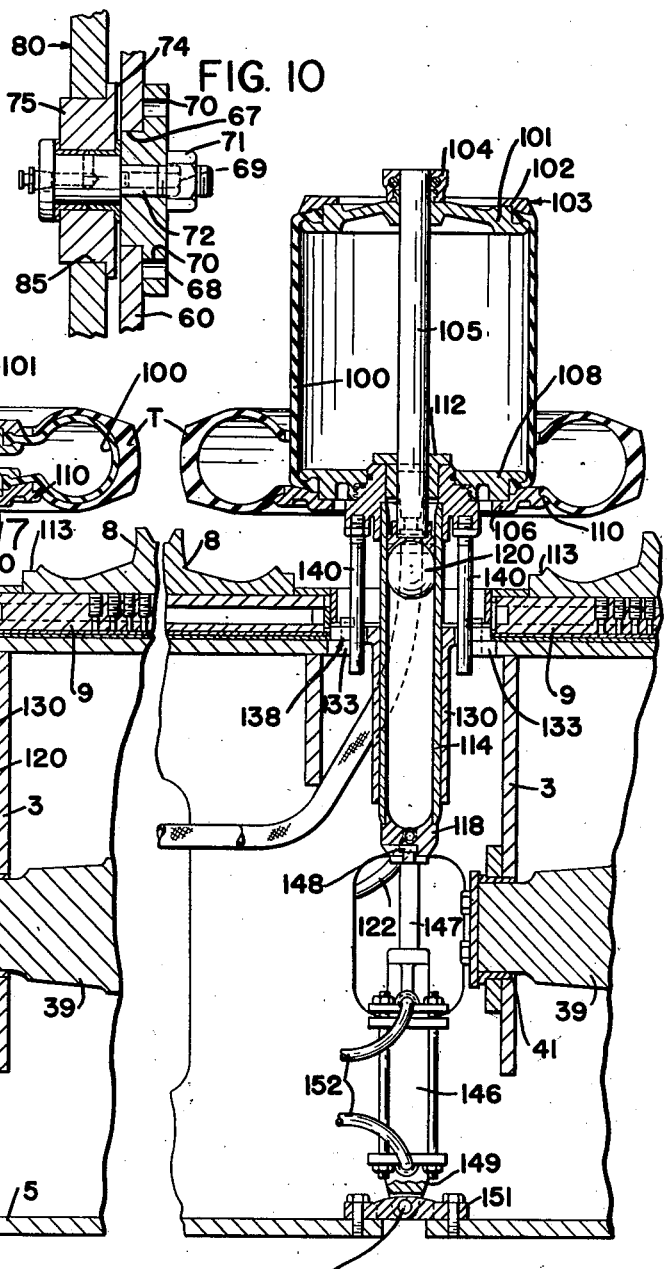
Fig. 6 is a view similar to Fig. 5 but with the diaphragm stripped from the tire and fully extended.

The entire diaphragm assembly is movable vertically to lift the cured tire from the lower mold section as shown in Fig. 5. For this purpose the cylinder 114 is slidable vertically in a sleeve 130 which is located in the aperture 131 in the bed plate 1. The outline of this aperture is shown in Fig. 7, it being noted that it is provided with two large bays 132 where the pipes 126 are located. The smaller bays 133 are for the reception of guide rods to be described.

The upper end of the sleeve 130 is provided with two oppositely located horizontal wings 135, which rest upon the bed plate 1 between the bays and which are secured to the bed plate by the four bolts 137. The wings 135 are slotted as at 138 to receive rods 140 which are threaded into the under side of the lower diaphragm ring 106 and serve to guide and steady the movement of the diaphragm assembly.

The diaphragm assembly is raised to strip the tire out of the lower mold section as in Fig. 5, and lowered to return the extended diaphragm assembly to band-receiving position as in Fig. 4, by the operation of a piston 145 movable by fluid pressure in a cylinder 146, the piston rod 147 of which is provided with a head 148 fixed in a slot in the plug 118 at the lower end of cylinder 114. The lower end of the cylinder 146 is supported on a bracket 149, which is pivoted at 150 to a bracket 151 attached to the base plate 5. Conduits 152 admit fluid pressure to opposite sides of the piston 145. The admission of pressure to raise the diaphragm assembly is controlled by the limit switch and the lowering of the diaphragm assembly is controlled by the operator through any suitable valve (not shown).

The purpose of the slotted connection between the plug 118 and the rod 147 and the pivotal mounting of the cylinder 146 is to facilitate the removal or replacement of the cylinder 114. It is sometimes necessary to repair the mechanism for raising and lowering the lower diaphragm ring, which in service will wear or become fouled with debris accumulated during many curing operations.

The specific arrangement of the coaxial cylinders for operating the diaphragm is an improvement upon similar mechanism shown in applicant's prior application Serial No. 382,998, filed September 29, 1953 (now Patent No. 2,775,789, January 1, 1957). The coaxial arrangement of cylinders for this purpose is sufficiently covered in claims of that patent and specific claims are not required.

*Resumé*

The operation of the press will be understood from the foregoing, it being desirable to review it in a general way only. The details of any timer or control mechanism for operating the various parts in proper sequence are not described, as instruments for the purpose are old and well-known in the art.

The press being fully opened as in Fig. 4, the operator places the uncured tire band B over the diaphragm where it will rest upon the lower diaphragm bead ring 106. The operator now presses a button and the bull gear will start its downward movement, the initial operation of which is to rock the upper mold section about the rollers 75 into a plane parallel to the plane of the lower mold section, as shown in dotted lines in Fig. 4. Continued rotation of the bull gear will move the upper mold section downwardly in a straight line, it being guided in this movement by the movement of the rollers 64 and 75 in the vertical guideways 87 and 85. Shortly after the upper mold starts its travel downwardly, the bead ring 18 will mate with the coned surface 103 on the upper diaphragm ring, and the further downward movement of the upper mold section will force the upper diaphragm plate 101 downwardly and compress and shape the diaphragm and the tire band. During this operation, low pressure steam may be admitted to the diaphragm to assist in shaping the tire.

When the mold is fully closed around the tire, high pressure steam will be admitted and maintained for a sufficient period to cure the tire, whereupon the timer will shut off the steam and, after a suitable interval for the pressure to recede to a safe limit, the timer will start the motor 48 in reverse, raising the uper mold in a straight line and then rocking it out of the way.

After the upper mold has moved away from the lower mold to a sufficient extent, fluid pressure is admitted to the cylinder 146 which raises the whole diaphragm assembly to the position shown in Fig. 5, which strips the cured tire T from the lower mold section. After the tire is stripped from the mold, pressure is admitted to the lower end of the cylinder 114, which, acting on the ball piston 120, raises the upper diaphragm ring, extending the diaphragm 100 and stripping it out of the tire. In this position the parts will remain until the operator removes the cured tire and by the operation of a suitable valve will reverse the pressure in the cylinder 146, restoring the extended diaphragm to the position shown in Fig. 4, which completes the cycle.

Where the terms upper and lower mold sections are used in the specification and claims, it will be understood that these terms are relative only and that relationship of the two sections is unimportant and may be changed. It will also be understood that certain parts of the press may be used without a diaphragm as in the shaping and curing tubeless tires.

What is claimed is:

1. A tire shaping and vulcanizing press having a stationary lower mold section and a movable upper mold section, a guide plate on the press beside the stationary mold section, two parallel vertical front and rear guideways in the guide plate, operating links at the sides of the press to raise and lower the movable mold section, a cross head pivoted to the upper ends of the links, means to support the movable mold section from the cross head, a backwardly and downwardly inclined extension at the upper end of the front guideway, said extension approaching the upper end of the rear guideway as it extends rearwardly, a guiding arm attached to the cross head, front and rear rollers on the guiding arm receivable in the front and rear guideways, respectively, said rollers during the opening movement of the press being movable by the links to the upper ends of the respective guideways, the front roller being movable thereafter over the aforesaid extension of its guideway, while the rear roller is movable downwardly in the rear guideway until the cross head is positioned over the top of the guide plate.

2. A press in accordance with claim 1 in which one of the rollers is connected to the guiding arm by an eccentric mounting which is adjustable about the axis of the roller.

References Cited in the file of this patent

UNITED STATES PATENTS

| | | |
|---|---|---|
| 1,947,335 | DeMattia | Feb. 13, 1934 |
| 2,260,966 | Brundage | Oct. 28, 1941 |
| 2,495,664 | Soderquist | Jan. 24, 1950 |
| 2,559,119 | Frank | July 3, 1951 |